United States Patent
Gorenzweig et al.

(10) Patent No.: US 9,505,312 B2
(45) Date of Patent: Nov. 29, 2016

(54) LOCKING APPARATUS FOR ELECTRIC CHARGING CABLES OR FLAPS

(75) Inventors: Igor Alexander Gorenzweig, Wuppertal (DE); Stefan Mönig, Schwelm (DE)

(73) Assignee: HUF HULSBECK & FURST GMBH & CO. KG, Velbert (DE)

( * ) Notice: Subject to any disclaimer, the term of this patent is extended or adjusted under 35 U.S.C. 154(b) by 228 days.

(21) Appl. No.: 14/119,948

(22) PCT Filed: Jun. 11, 2012

(86) PCT No.: PCT/EP2012/061042
§ 371 (c)(1),
(2), (4) Date: Jan. 30, 2014

(87) PCT Pub. No.: WO2012/168488
PCT Pub. Date: Dec. 13, 2012

(65) Prior Publication Data
US 2014/0210410 A1    Jul. 31, 2014

(30) Foreign Application Priority Data
Jun. 9, 2011   (DE) ........................ 10 2011 050 998

(51) Int. Cl.
*H02J 7/00* (2006.01)
*B60L 11/18* (2006.01)

(52) U.S. Cl.
CPC ......... *B60L 11/1818* (2013.01); *B60L 2270/32* (2013.01); *B60L 2270/34* (2013.01); *Y02T 10/7005* (2013.01); *Y02T 10/7072* (2013.01); *Y02T 90/14* (2013.01)

(58) Field of Classification Search
USPC .................. 320/109; 439/153, 162, 347, 304
See application file for complete search history.

(56) References Cited

U.S. PATENT DOCUMENTS 5,385,480 A  *  1/1995  Hoffman ............. B60L 11/1818
                                                                439/138
7,878,866 B1     2/2011  Kwasny et al.
(Continued)

FOREIGN PATENT DOCUMENTS

CN         201674065 U     12/2010
DE      102009030092 A1    12/2010
(Continued)

OTHER PUBLICATIONS

International Search Report for corresponding application PCT/EP2012/061042 filed Jun. 11, 2012; Mail date Feb. 21, 2012.
(Continued)

*Primary Examiner* — Brian Ngo
(74) *Attorney, Agent, or Firm* — Cantor Colburn LLP

(57) ABSTRACT

The invention relates to a locking apparatus (10) for locking and unlocking a charging cable plug (22) of a charging cable, in particular for a vehicle, to a charging cable socket having at least one moving locking means (15), in particular in the form of a locking pin, which serves to mechanically lock the charging cable plug (22) to the charging cable socket, wherein the locking means (15) has at least a locking position (II), in which the charging cable plug (22) can be locked by the locking means (15), and an unlocking position (I), in which the charging cable plug (22) can be released by the locking means (15), and having an electromechanical drive (13), which drives the locking means (15), as a result of which it is possible to generate a changeover between the locking position (II) and the unlocking position (I). According to the invention, provision is made for at least one overload means to be provided between the charging cable plug (22) and the charging cable socket, as a result of which the charging cable plug (22) can be disconnected from the charging cable socket in the locking position (II) when excessive force is applied.

20 Claims, 10 Drawing Sheets

(56) References Cited

U.S. PATENT DOCUMENTS

| | | | |
|---|---|---|---|
| 2009/0082916 A1* | 3/2009 | Tanaka | B60K 6/48 701/22 |
| 2011/0287649 A1* | 11/2011 | Kurumizawa | B60L 11/1818 439/304 |
| 2011/0300733 A1* | 12/2011 | Janarthanam | B60L 11/1818 439/304 |
| 2011/0300736 A1* | 12/2011 | Katagiri | B60L 11/14 439/347 |
| 2012/0143401 A1* | 6/2012 | Jayadevappa | B62H 3/00 701/2 |
| 2012/0313580 A1* | 12/2012 | Charnesky | B60L 11/1818 320/109 |

FOREIGN PATENT DOCUMENTS

| | | |
|---|---|---|
| JP | 2010103003 A | 5/2010 |
| WO | 2011062004 A1 | 5/2011 |

OTHER PUBLICATIONS

International Preliminary Report on Patentability (Translation) for corresponding application PCT/EP2012/061042 filed Jun. 11, 2012; Date of Issuance Dec. 10, 2013.

Chinese Office Action issued Jun. 12, 2015 re: Chinese Application No. 201280028287.8; citing: DE102009030092A1, U.S. Pat. No. 7878866B1, WO2011062004A1, U.S. Pat. No. 5385480A, CN201674065U and JP2010103003A.

* cited by examiner

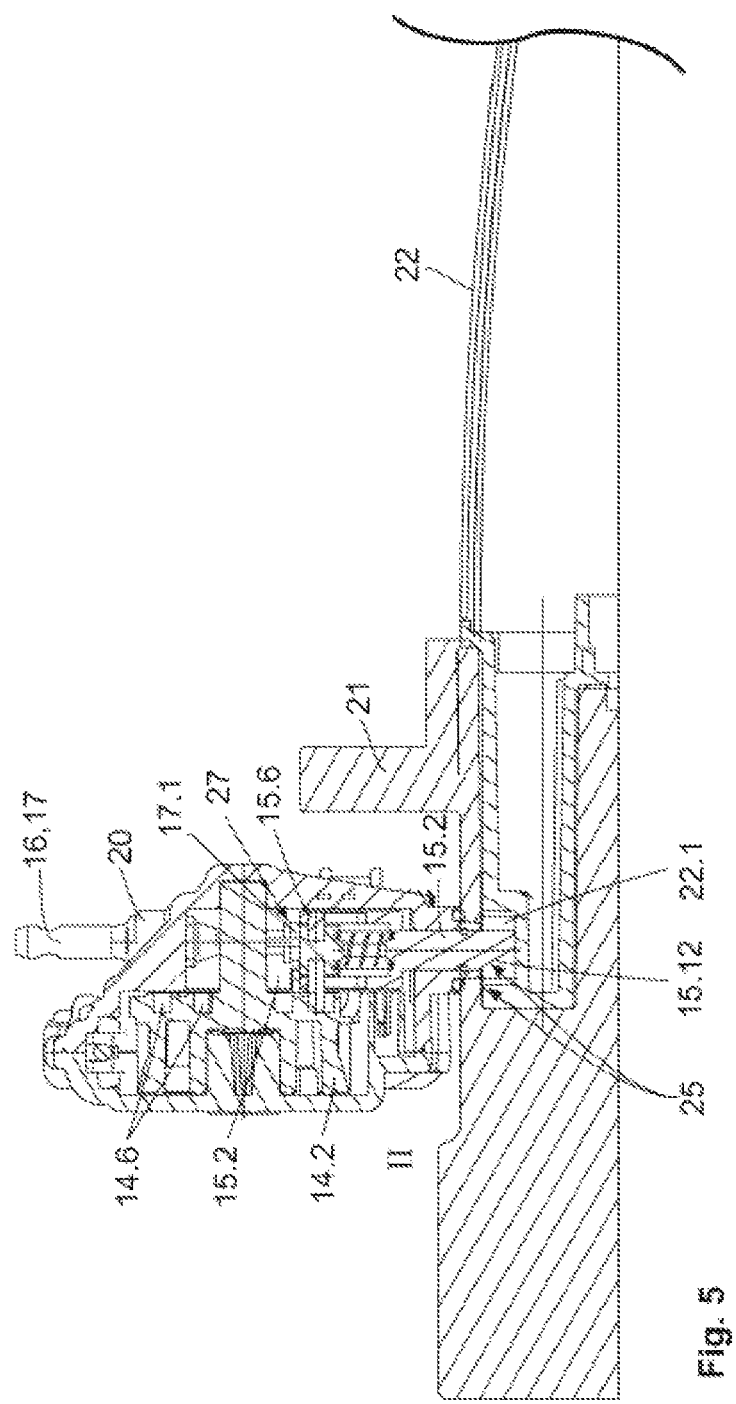

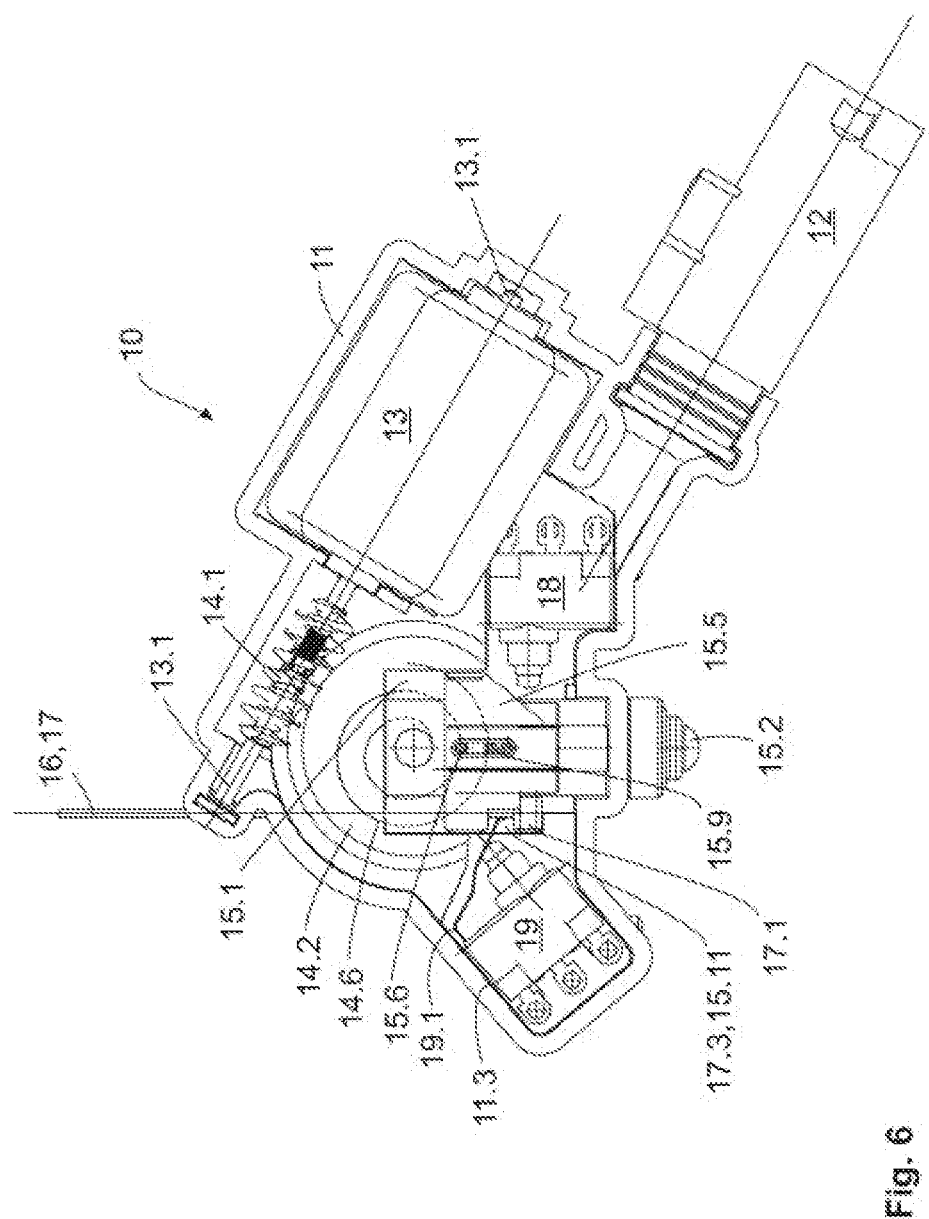

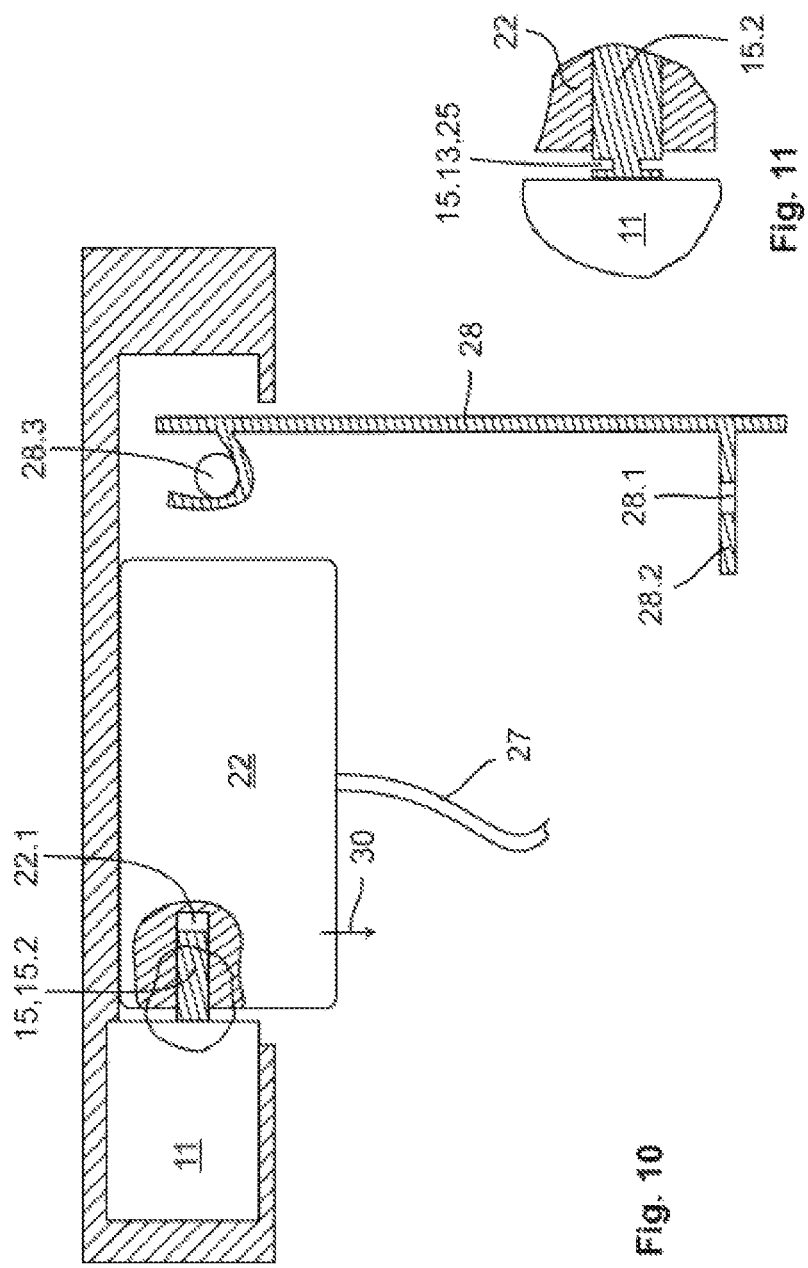

LOCKING APPARATUS FOR ELECTRIC CHARGING CABLES OR FLAPS

TECHNICAL FIELD

The present invention relates to a locking device, for the purpose of locking and unlocking a panel and/or a charging cable plug of a charging cable, particularly for a vehicle, to a charging socket. The panel named above, and the charging cable plug named above, each form a moving part which should be designed in a manner allowing securement and/or locking by means of the locking device according to the invention, particularly to a vehicle. Such locking devices have at least one moving locking means, particularly in the form of a locking bolt which serves the purpose of mechanically locking the moving part, wherein for the locking means, at least one locking position in which the moving part can be locked by the locking means, and one unlocked position in which the moving part can be released by the locking means, are available. In addition, an electromechanical drive is included which drives the locking means, such that it is possible to switch between the locking position and the unlocked position. In general, said locking means and the drive are arranged in a housing for the locking device.

BACKGROUND

Such locking devices having a charging cable plug are used in the field of vehicles, particularly electric vehicles, in order to produce a secure and protected connection between the energy source and the vehicle during a charging process for the electrical energy storage device of the vehicle, by securing the charging cable, together with the charging cable plug, to the vehicle. In addition, such locking devices can serve the purpose of locking a panel, particularly a panel which is arranged behind the charging cable socket or a tank support or the like. For this purpose, there is at least one corresponding charging cable socket included on the vehicle, in order to then enable the vehicle to connect to an external charging station as the energy source. In this case, it is desirable to prevent the charging cable from being stolen, as well as the charging process from being interrupted by a third party, who then diverts the energy from the charging cable for an unintended use, and optionally charges another vehicle. For this purpose, such locking devices are configured between the charging cable plug and the corresponding charging cable socket on the vehicle, which is particularly controlled via the electronics of the vehicle, or between the charging cable plug and the corresponding charging cable socket on the charging station. In this case, it is particularly possible to take advantage of the security system of the vehicle—such as the electronic central lock system or the immobilization system. In any case, the charging process of the electrical energy storage device in electric vehicles takes significantly longer than a comparable gas filling process in vehicles driven by fossil fuels. For this reason, it is hardly possible for a user of the vehicle to personally monitor the entire charging process. As a result, this charging process will also take place unintentionally by means of the electrical charging cable.

A charging cable plug for electric vehicles is known from DE 10 2009 030 092 A1, said charging cable plug being mechanically locked via such a locking device having corresponding locking means. In this case, two locking means automatically advance into the openings in the charging cable plug provided therefor, when said charging cable plug is connected to the charging cable socket of the vehicle. In this manner, the charging cable plug is mechanically secured on the vehicle against unauthorized removal.

However, this prior art has the disadvantage that the electrical connection between the charging station and the vehicle is not permanently secured by the user during the charging process. As such, an undesired application of force to the charging cable can occur—for example as a result of an accident—by, for instance, a bicyclist, a pedestrian, or the like failing to notice the charging cable and pulling on the same by his or her movement. In this manner, the charging cable plug can be torn out of its charging cable socket in the vehicle or on the charging stations. In this case, parts of the charging cable or the particular locking device are typically destroyed, such that there is a risk of an electric shock or an electrical short circuit. In addition, the charging cable can be torn out of the charging cable socket, because this connection is not generally designed for mechanical loads. In this case as well, the problems described above can occur. What must be considered in this case is that the charging process particularly also takes place in public and potentially poorly-lit locations which are accessible to third parties. In addition, the occurrence of unauthorized parties suffering fatal hazards as a result of forcibly removing the charging cable plug from the charging cable socket should be prevented.

BRIEF SUMMARY

The problem addressed by the present invention is that of creating a locking device and a method for the locking and unlocking of a moving part, such as a panel and/or a charging cable plug to or from a charging cable socket, wherein the disadvantages of the prior art are removed. In particular, a further problem addressed by the invention is that of making it possible for the charging cable plug to separate upon a coarse application of undue force, without the risk of an electrical shock or an electrical short circuit, and/or of enabling a non-destructive opening of the panel.

The problem is addressed by the present invention by a locking device. In addition, the problem is addressed by the present invention by a method for the locking and unlocking of a panel and/or a charging cable plug to or from a charging cable socket.

According to the invention, in the locking device, at least one overload means is configured between the panel and/or the charging cable plug and the charging cable socket, whereby the charging cable plug can be separated from the charging cable socket in the locking position (II) upon the application of undue force, and/or the panel can be switched into its open position.

At this point, it is hereby noted that two or more locking means can also be included in the locking device. In the context of this invention, the locking device can be configured both on the vehicle and on the charging station, wherein the panel and/or the charging cable plug constitutes the moving component which can be secured and/or locked by the locking means. In the context of the locking and unlocking of the moving part, the two terms, "panel" and "charging cable plug" should be understood as synonyms, even if the two moving parts (the panel and the charging cable plug) naturally comprise different technical functions.

In the text below, the assumption is always made that the charging cable plug should only separate from the charging cable socket as the result of an application of undue force, wherein nevertheless the charging cable plug is previously mechanically connected to the charging cable socket, particularly via the locking means. Said undue force is applied externally to the charging cable, particularly to one of the corresponding charging cable plugs. The charging cable itself can particularly be configured with two charging cable plugs which work together both mechanically and electrically with corresponding charging cable sockets in the charging station and the vehicle. It can also be contemplated that the charging cable has only one charging cable plug at one position, which serves the purpose of connecting the charging cable to the vehicle or the charging station. As such, the locking device according to the invention can be configured on the vehicle and/or on the charging station. The external application of undue force can be precipitated by an accident by a conscious act of theft, as described above. The panel as well—particularly for a charging cable socket—can be switched from its closed position to its open position upon the external application of undue force, by means of the included overload means, without destruction—meaning in a non-destructive manner. In any case, it can likewise be contemplated that the device according to the invention only releases the charging cable plug but not the panel present, upon an application of undue force, such that this panel can only be switched from its closed position to its open position by a conscious mechanical destruction.

According to the invention, the overload means can switch the locking means, particularly in a purely mechanical and/or electromechanical manner, from its locking position to its unlocked position, whereby the charging cable plug can be removed from the charging cable socket. If the overload means switches the locking means from its locking position into its unlocked position in a purely mechanical manner, a bevel, rounding, or chamfer can be configured for this purpose on the point of the locking means, which works together mechanically with a contact surface on the charging cable plug in order to push the locking means from its locking position into the unlocked position. In this case, said bevel and/or chamfer on the point of the locking means, as well as the contact surface on the charging cable plug, serve as overload means (see FIG. 5). Because a locking part of the locking means is spring-loaded and therefore is designed to be able to give toward the guide part of the locking means, the locking part can be depressed by means of the application of undue force at least partially into the housing of the locking device.

In the context of the invention, it can also be contemplated that the purely mechanical overload means is designed in the form of a predetermined breaking point, particularly on the locking means, thereby ensuring that a mechanical separation is still possible despite a coarse application of undue force to the connection panel and the locking device and/or the charging cable plug and the locking device in the locking position of the locking means. Of course, such as overload means in the form of a predetermined breaking point only releases one time, and cannot be used again. If the locking means is designed having an overload means in the form of a predetermined breaking point, the locking means must be replaced and/or exchanged after the single release resulting from an application of undue force. The overload means in the form of a predetermined breaking point can be designed as a narrowing, a constriction, or a bore hole in the locking means. The predetermined breaking point is advantageously arranged in the locking position of the locking means exactly in the region of the external edge of the housing of the locking device, such that a break between the locking device, particularly the locking part, and the charging cable plug and/or the panel is possible, in a reliable manner.

It can likewise be contemplated that the overload means produces an overload signal, thereby switching the locking means from its locking position into its unlocked position by means of its electromechanical drive. As such, the normal unlocking process is initiated which is generally carried out when the locking device is used in normal operation. In any case, the overload means is used here for the purpose of producing a corresponding trigger- and/or overload signal. For this purpose, the overload means can have at least one sensor which measures the application of undue force and produces a corresponding overload signal. This sensor can particularly measure forces which are created in the locking device as the result of the application of undue force. Of course, multiple sensors can also be included to differentiate the application of undue force from other disturbances, using measurement.

In addition, it can also be contemplated that the overload means controls the electromechanical drive of the locking means, particularly by means of an overload signal, whereby the locking means can be switched from its locking position into its unlocked position by means of the electromechanical drive. For this purpose, a predetermined trigger force can particularly be used which is compared to the overload signal from the sensor of the overload means, and when the trigger force is exceeded, the electromechanical drive for the locking means is activated. In this case, the procedure can also take into account the fact that, by way of example, a jump in force is detected by the sensor of the overload means, which indicates an accident as the application of undue force. If, in contrast, a very slow increase in force, by way of example, is detected in the overload signal, this may point rather to a manipulation by an unauthorized party, such that the trigger force in this case must be significantly increased before the electromechanical drive of the locking means is activated by the overload means. As a consequence, it is possible within the scope of the invention to establish different trigger forces and trigger speeds, as well as the increase in the trigger force, and to only provision the separation of the charging cable plug from the charging cable socket, and/or to provision the activation of the electromechanical drive for the locking means, upon a desired specification. As such, it is possible to precisely set the trigger force for the application of undue force in the locking device according to the invention for and/or by the overload means. In addition, it can also be contemplated that an electrical charging current, particularly in the charging cable and/or the locking device, can be cut by means of the overload signal which is present when there is an application of undue force. In this way, the risk of injury for a third party is significantly reduced. In addition, an alarm signal can also be produced for the cut-off of current, such that the application of undue force to the charging cable plug can be noticed even if the charging cable plug perhaps continues to be present in the charging cable socket, or has been inserted back into the charging cable socket retroactively. As a result of this alarm signal, the electrical charging current can also be cut off. This cut-off can take place on board the vehicle, on the one hand, and on the other hand can also take place on the charging station. In this case as well, the predetermined trigger force can be used as the triggering event if the overload signal exceeds the value of the trigger force.

The drive for the locking means can drive the locking means directly, or indirectly via a gearing. The drive itself can be designed as a servomotor or simply as an electromagnet which moves the locking means back and forth between the locking position and the unlocked position. The locking means advantageously holds at least the locking position, and preferably also the unlocked position, without supplying electrical energy, particularly when the drive is in the form of an electromagnet. If the drive also includes a gearing, the gearing can be designed to lock independently, as in the case of a worm gear, for example. As such, it is possible to attain a configuration wherein the entire locking means can be moved exclusively by the drive, and not externally. In addition, it is possible that the locking device according to the invention only consumes energy when the locking means is moved between its locking position and unlocked position.

In addition, the locking means of the locking device according to the invention can be constructed in two parts, and for this purpose can have at least one guide part and one locking part which is particularly spring-loaded. The locking part can slide longitudinally and therefore is arranged in a manner allowing movement relative to the guide part. A spring element is included between these two parts, whereby the locking part is pushed away from the guide part. A receiving guide and/or -opening for the guide part can be included in the locking part, wherein the guide part can push into said guide and/or opening. The spring element described above can also be arranged in this receiving guide, wherein it can be and/or is held in a positive-fitting manner on projections of the locking part and the guide part. The guide part and the locking part of the locking means can be held together via at least one connection part, particularly in the form of a connection pin. It can likewise be contemplated that the locking means is constructed as a single, rigid part.

According to the invention, it can be contemplated that the overload means serves the purpose of non-destructively separating the charging cable plug from the charging cable socket in the locking position in a purely mechanical or electromechanical manner. In this case, this means that the insulation of the charging cable and the charging cable plug, as well as of the charging cable socket, remains in-tact and functional.

According to the invention, the overload means can have at least one sensor which can be designed as a strain gauge, a piezoelectric, inductive, magnetoelastic, hydraulic, or mechanical force transducer, or as an optical sensor. It can likewise be contemplated that the sensor is designed as a distance sensor, resistance sensor, force sensor, or contact sensor. It can likewise be contemplated that multiple sensors having a different manner of construction and different functionality are used for the overload means. In addition, comparison sensors or control sensors can be present in order to, to the greatest possible extent, only reach a triggering of the overload means in the event of an application of undue force. At least one sensor of the overload means can be arranged between the locking means and a guide segment for the locking means, wherein the guide segment can form at least one part of a housing of the locking device. As a result of the application of undue force, a tensile force is created in the charging cable, and therefore also in the charging cable plug, which leads to the locking means being subjected to shearing forces. These are the result of tensile forces acting on the point of the locking means, particularly the locking part, by means of the charging cable plug, which are present on the opposite side as compression forces because the locking means is supported on the guide segment, in order to form the necessary counter bearing. In this case, at least one sensor of the overload means can be arranged directly on the locking means and/or on the guide segment for the locking means.

It can likewise be contemplated that at least two sensors of the overload means are arranged between the locking means and the guide segment for the locking means. In this case, the two sensors can have a different direction of measurement, particularly perpendicular to the other, if they are arranged on the same side. It can likewise be contemplated that the two sensors are arranged on opposite sides of the locking means in order to thereby be able to measure the deformation and/or the forces acting on the locking means as compression forces on one side, and as tensile forces on the other side. In this example as well, two sensors can be arranged on each side of the locking means, thereby enabling an especially precise measurement of force. For example, a Wheatstone bridge can be used in this case in order to enable compensation of the greatest number of external environmental influences using measurement.

The sensors of the overload means named above can also be integrated into the locking means or the guide segment named above—meaning that they can also be arranged below a corresponding surface. As mentioned above, not only can an absolute force on the locking means be detected by means of the sensors, but also the increase and the speed of the corresponding force can be detected.

It can likewise be contemplated that at least one sensor of the overload means is arranged between the charging cable plug and the charging cable socket. In this case, the corresponding sensor can particularly be designed as a distance sensor, resistance sensor, force sensor, or contact sensor. As such, the mechanical play between the charging cable plug and the charging cable socket in the locking position of the locking means can be measured by at least one sensor of the overload means—whereby the mechanical connection between the charging cable plug and the charging cable socket is also included in this context. As soon as this play is exceeded, the locking means can be actuated to unlock by means of the electromechanical drive.

According to the invention, at least one further sensor can likewise measure the position of the locking means, and/or the position of the charging cable plug in the charging cable socket can be measured by means of at least one further sensor. Likewise, yet another sensor can be included which also monitors the position of the electromechanical drive using measurement. Using this information, it is possible to precisely determine the state of the locking device, and particularly for a wide variety of cases—and particularly also an application of undue force. This information from the further sensors can likewise be used to undertake a compensation or a comparison with the overload signal by the overload means.

In addition, the present invention also relates to a method, for the actuation of a locking device for locking and unlocking a locking position for a vehicle, wherein a locking means can lock and unlock the charging cable plug to and/or from the charging cable socket. The inventive aspect of the method is that, in the event of an application of undue force to the mechanical connection between the charging cable plug and the charging cable socket in the locking position (II), the mechanical connection is released—particularly by an overload means, thereby separating the charging cable plug from the charging cable socket. In this manner, the locking device according to the invention can be included for the purpose of using the method.

In addition, it can also be contemplated for the method according to the invention that in the event of the application of undue force, a purely mechanical actuation of the locking device takes place by means of the overload means, whereby the locking means is switched from its locking position into its unlocked position.

Likewise, within the scope of the method according to the invention, the overload means can measure the application of undue force, particularly by means of a sensor, and can actuate the electromechanical drive of the locking means in such a manner that the locking means is switched from its locking position into its unlocked position.

The invention is described in various embodiments by the dependent claims and the following description, wherein features and details which are disclosed in the context of the device according to the invention are also in the context of the method according to the invention, and vice-versa, such that reference is always made to both contexts where there is a disclosure of the individual aspects of the invention.

BRIEF DESCRIPTION OF THE DRAWINGS

Further measures and advantages of the invention are found in the claims, the following description, and the illustrations. In the drawings, the invention is illustrated in different embodiments. Here, features indicated in the claims and in the description can be essential for the invention individually or in any and all combinations, wherein:

FIG. 5 shows a cutaway illustration of a further locking device having an overload means which functions purely mechanically, FIG. 6 shows a cutaway illustration of a further locking device

FIG. 10 shows a cutaway illustration comparable to FIGS. 8 and 9, having the locking device in these figures, wherein the charging cable plug is arranged in its open position, and the charging cable plug is plugged onto the charging cable socket and is locked by the locking device, and FIG. 11 shows a schematic view of a locking means of a locking device having an overload means in the form of a predetermined breaking point.

DETAILED DESCRIPTION

Figure 1:
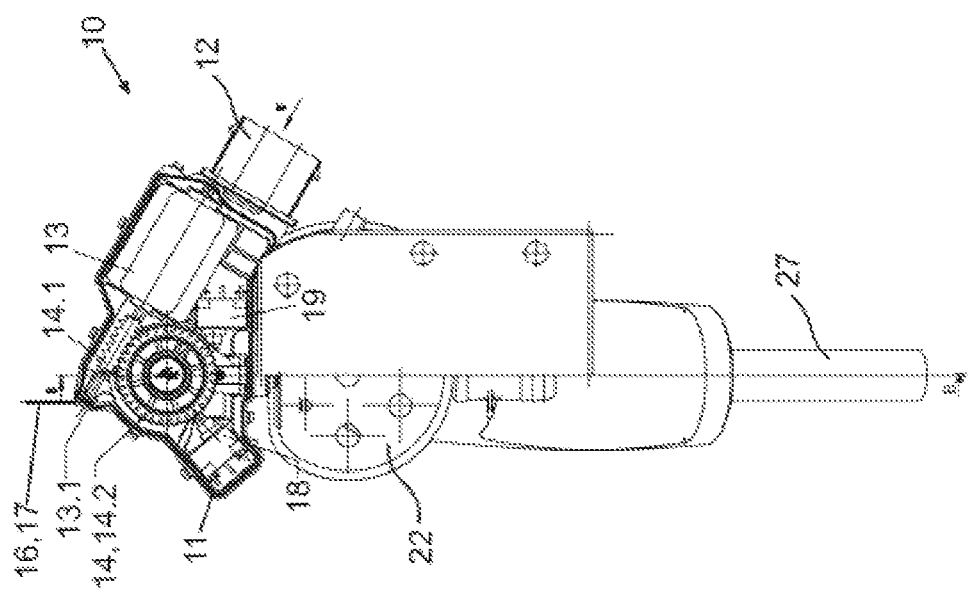
FIG. 1 shows a partial cutaway view of a locking device according to the invention, with the charging cable plug plugged in and in the locking position (II)

In the figures, the locking device 10 according to the invention is illustrated in various views and variants. The same technical features in the figures have the same reference numbers and the same technical function.

The locking device 10 according to the invention is illustrated in various views in FIGS. 1 to 7, wherein its housing 11 has been partially cut open to provide a better view, in order to make it possible to portray the components 13 to 19 in particular. The housing 11 itself is constructed in two parts, and has a lower housing half 11.1 and an upper housing half 11.2. For the purpose of sealing the housing halves lying one on top of the other, a tongue and groove system is provided by means of which a labyrinth seal is produced. The two housing halves 11.1, 11.2 are held together via latch connections 11.4 which are arranged laterally on the mold parting line between the two housing halves 11.1, 11.2. These latch connections 11.4 comprise clip connections which are constructed from a spring clip and which work together mechanically with wedge-shaped projections in order to particularly produce a positive-fit connection. In addition, a connection socket 12 which has electrical contacts 12.1 (see FIGS. 1, 6, and 7) is arranged on the housing 11 to enable the realization of an electrical energy supply and optionally also an actuation of the locking device 10. The plug socket 12 is designed as a single piece in the present embodiments of the locking device 10 according to the invention, and also unified with the material of the housing 11. A locking means 15 can be seen through the open housing 11, which can be moved via a drive 13. A gearing 14 in the form of a worm drive is arranged between the drive 13 and the locking means 15, wherein the worm gear 14.2 can be easily seen which accommodates the locking means 15 in a manner allowing longitudinal movement. A control means 14.3—which is more easily seen in FIG. 6—for a second sensor 18 is likewise arranged on the worm gear 14.2. In FIGS. 1, and 5 to 7, an emergency unlocking mechanism 16, particularly in the form of a traction means 17, projects from the upper housing half 11.2, and is sealed with a seal 20 in order to protect the interior of the housing 11 from external influences such as dust, moisture, and the like.

Figure 3:
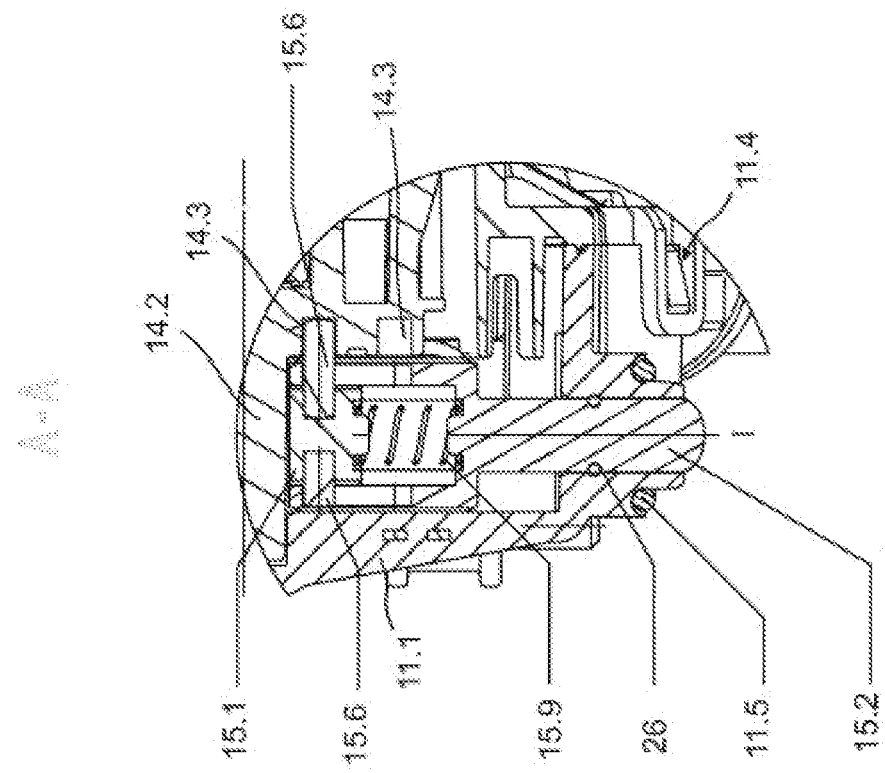
FIG. 3 shows a comparable enlargement of the cut B-B from FIG. 2 through a two-part locking means in an unlocked position.

FIG. 3 shows an enlarged longitudinal cut A-A through the locking device 10 in FIG. 1. Here, the locking means 15 is constructed in multiple parts, and has a guide part 15.1 which is driven by the worm gear 14.2. It can also be contemplated that the locking means 15 is driven directly by the electromechanical drive 13. In the present case, however, the locking means 15 is arranged in a guideway 14.3 in the worm gear 14.2, and works together with the guideway 14.3 in the worm gear 14.2 via a connection part 15.6. A rotation of the worm gear 14.2 therefore causes the locking means 15—of, particularly, the guide part 15.1—to slide longitudinally, such that the locking means 15 can be moved back and forth between its unlocked position I and locking position II. The upper and lower limit stops of the locking means 15 are also defined by the ends of the guideway 14.3 in the worm gear 14.2

Figure 2:
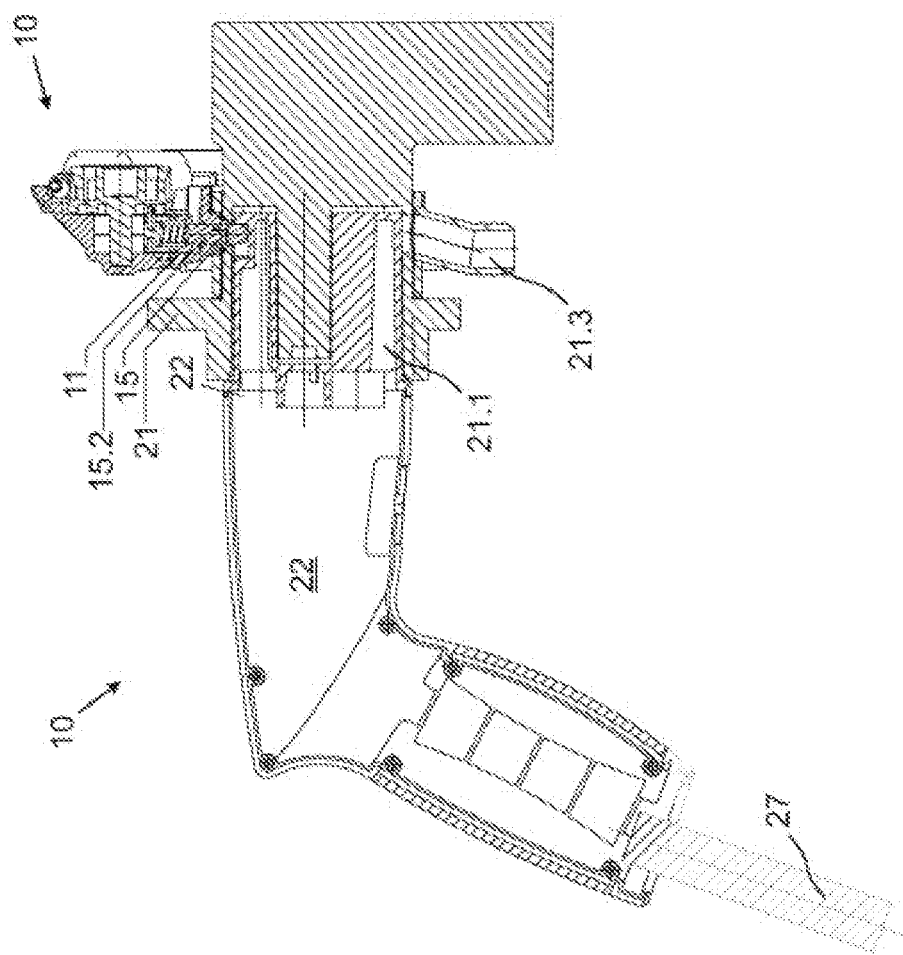
FIG. 2 shows a cut B-B through the locking device in FIG. 1.

As can also be easily seen in FIG. 2, the locking part 15.2 is arranged in a manner allowing longitudinal sliding, and therefore movement relative to the guide part 15.1. A spring element 15.9 is included between these two parts, and the locking part 15.2 is pressed away from the guide part 15.1 by means of said spring element [15.9]. A receiver guide and/or -opening for the guide part 15.1 is included in the locking part 15.2, and the guide part 15.1 can plunge into said opening. The spring element 15.9 described above is also arranged in this receiver guide, and is held in a positive-fitting manner on projections of the locking part 15.2 and guide part 15.1. As is clear in FIG. 3, the two parts 15.1, 15.2 of the locking means 15 are held together via at least one connection part 15.6, particularly in the form of a connection pin. The traction means 17 for the emergency unlocking device 16, which is only accessible from the interior of the vehicle, has a compensation element 17.3 in order to be able to compensate for the movement of the locking means 15 between the locked and unlocked positions. As such, it is not necessary for the traction means 17 to be completely moved when the locking means 15 is moved out into the locking position II. The compensation element 17.3 rather functions such that a movement of the traction means 17 outside of the housing 11, when the locking means 15 is switched from its locked position II to its unlocked position I, is not necessary. As a result, both the first end 17.1 and the second end 17.2 of the traction means 17 can be independently fixed by tension or arranged in a fixed manner. In the figures, a flexible traction means 17.4 can be used, which can comprise a cable, wire, Bowden cable, or the like.

In order to ensure that a proper locking of the moving part 22, particularly the charging cable plug 22, in the locking position II has taken place, a control means 15.5 for the first sensor 18 is arranged on the locking part 15.2. This control means 15.5 comprises a control contour which projects from the outer periphery of the locking part 15.2 like a cam, and works together with the first signaling device 18. In FIG. 6, the locking means 15 is illustrated in its unlocked position I. Only once the locking part 15.2 can be inserted into a recess 22.1 in the moving charging cable plug 22 does the first signaling device 18 detect a spatial displacement of the locking means 15, and specifically the locking part 15.2, by means of the control curve 15.5. This measurement signal can be relayed by the first signaling device 18 to an electronic controller of the locking device 10 and/or to the on-board vehicle electronics.

FIG. 6 shows a cutaway view of a locking device 10 according to the invention. Here, it can be clearly seen that a second signaling device 19 is arranged on an inner side of a housing half 11.1 by means of holder, guide, and/or receiver elements 11.3. In addition, the mechanical interaction of the gearing 14 and the locking means 15 is readily seen. Also, the arrangement and attachment of the traction means 17 in the locking means 15 can be readily seen. In this case, the first end 17.1 of the traction means 17 has a thickening which is embedded in the recess 15.3 and is held there in a positive-fitting manner. The further traction means 17 is then guided along parallel to the seal 20 by the passage 15.4 and arrives at the guide part 15.1, in order to then be able to exit the housing 11 of the locking device 10. The second end 17.2 of the traction means 17 ends at the actuating element, which is not shown in FIG. 6.

In an emergency, an unlocking of the charging cable plug 22 takes place by the emergency unlocking mechanism 16 being actuated, which is carried out particularly by a tug on the traction means 17. As can be readily seen in FIG. 5 to FIG. 7, the locking part 15.2 is therefore slid by the engaged first end of the traction means 17 against the force of the spring element 15.9 to the guide part 15.1, and therefore releases the recess 22.1 of the moving part 22, thereby enabling movement once again of the moving part 22. A tug on the traction means 17 does not result in a displacement or rotation of the drive 13 or the gearing 14. Rather, the guide part 15.1 plunges into the receiver opening in the locking part 15.2 (whereupon only the locking part is moved), and in the process releases the positive-fit connection between the locking means 15 and the charging cable plug 22. An emergency arises if, by way of example, the locking device 10 cannot be supplied with electrical energy, or there is a control error, or there is a defect in the locking device 10, such that the locking device 10 no longer functions properly.

The gearing 14 can be seen in FIG. 6 as a worm drive 14. In this case, the worm 14.1 is seated in a torque-proof manner on a drive shaft 13.1 of the electromechanical drive 13, which is particularly designed as an electric motor. The rotary movement of the worm 14.1 is transmitted to the worm gear 14.2 via the toothing present, thereby rotating the worm gear 14.2 and sliding the locking means 15 longitudinally. A control means 14.3 in the form of a control curve 14.3 is arranged above the actual worm gear 14.2, thereby allowing the precise control of the drive 13. In addition, it is also possible to detect the exact positions of the locking means 15, and particularly of the guide part 15.1 and the locking part 15.2, using the signals from the first and second signaling device 18, 19. The second signaling device 19 samples the control curve 14.3 via a switch plate 19.1, wherein the switch plate 19.1 can exert a spring force on the second signaling device 19.

Similarly to FIG. 3, the corresponding locking device 10 is shown in FIG. 6 in the unlocked position I of the locking means 15, particularly of the locking part 15.2. In this case, the lateral clearance 15.11 for the first end 17.1 of the traction means 17 can be easily seen. Here, an amount of play with respect to the locking part 15.2 is included above the first end 17.1 of the traction means 17, such that this locking means 15 can also move freely back and forth between its locking position II and its unlocked position I without normally displacing the traction means 17. The spiral-shaped guideway 14.6 which is arranged laterally in the worm gear 14.2 is indicated in FIG. 6, and is easily seen in FIG. 7.

The locking means 15, and particularly the locking part 15.2, is illustrated in FIG. 1 in its locking position II.

A cutaway view of the locking device 10 according to the invention is illustrated in FIG. 5. In this case, the charging cable socket 21, with its electrical contacts 21.1, is also visible. It can likewise be seen (see FIG. 1) that the charging cable socket 21 has a protection against reverse polarity 21.2 which is designed as a flattened point in the otherwise round charging cable socket 21. As such, a corresponding charging cable plug 22 can only be inserted into the charging cable socket 21 in one position. In addition, an overload means is also illustrated in FIG. 5 as an overload means 25 which functions purely mechanically. For this purpose, the locking means 15 has a bevel/chamfer or rounding 15.12 on its locking part 15.2, and particularly the point thereof, by means of which the charging cable plug 22 is able to be removed in a non-destructive manner from its plugged position on the charging cable socket 21, by an application of undue force, and/or the panel 28 can be switched into its open position in a non-destructive manner. The opposing mechanical contact surface of the charging cable plug 22 and/or the panel 28 advantageously has a region which is geometrically complementary to the bevel, rounding, or chamfer 15.12 of the point of the locking part 15.2, in order to enable a clean mechanical interaction and therefore to prevent an undesired jamming. By means of the included spring element 15.9 (see FIG. 3), which is arranged between the guide part 15.1 and the locking part 15.2 of the locking means 15, it is possible to precisely define the trigger force of the mechanical overload means 25 in combination with the geometrically-designed point of the locking part 15, the same being a bevel, rounding, or chamfer 15.12. For this purpose, it is only necessary to previously define the spring force of the spring element, either by pretensioning or by the spring constant of the spring element itself.

Figure 7:
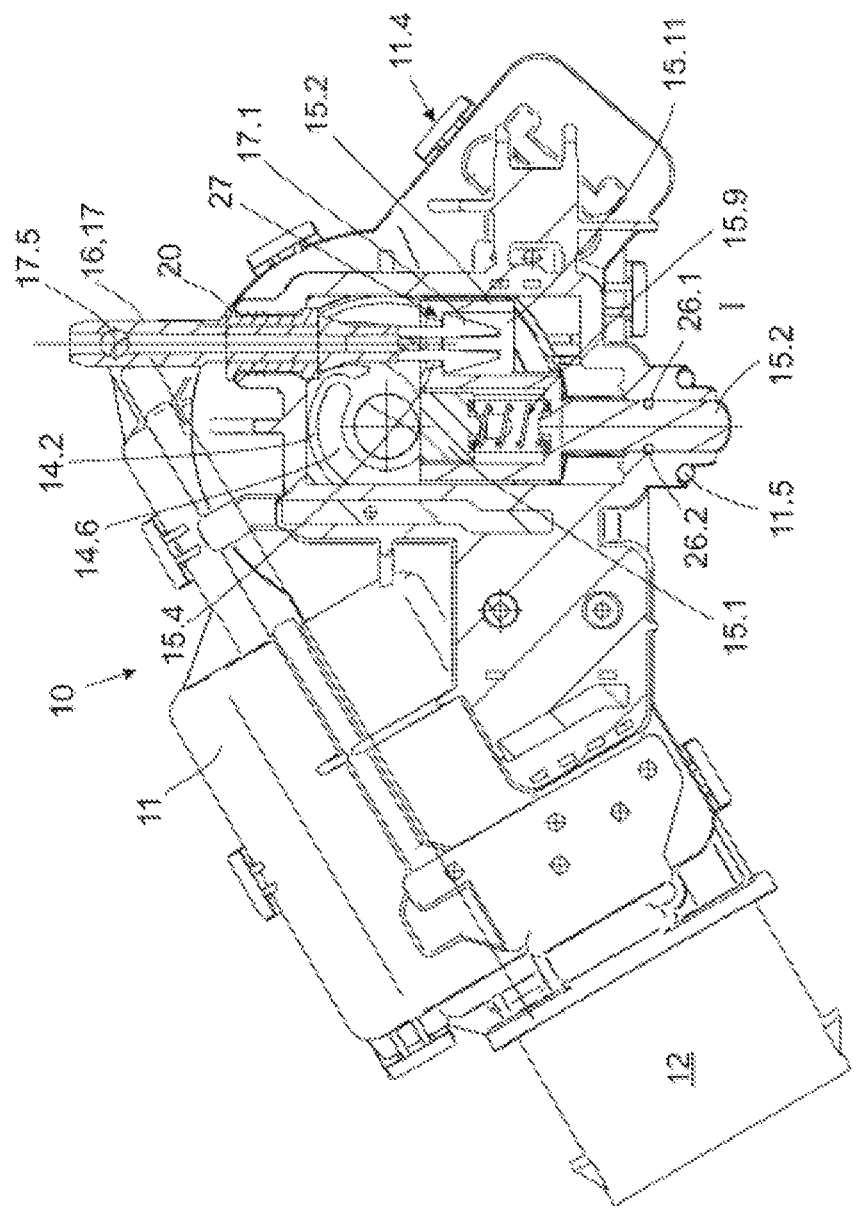
FIG. 7 shows a cutaway illustration of a further locking device having an overload means which functions purely electrically.

A further variant of the locking device 10 according to the invention is illustrated in FIG. 7. Here, it can be easily seen how the two housing halves 11.1 and 11.2 are connected to each other in a positive-fitting manner via various latch connections 11.4. The housing 11 is advantageously a molded plastic part. In addition, the housing 11 of the locking device 10 is connected to the charging cable socket 21 in a positive-fitting and/or force-fitting manner via, for example, one or more bolts 26. To make the locking device 10 exchangeable, a tool attachment piece can be included on the bolt head 26.1. The locking device 10 is securely fastened on the charging cable socket 21 via the bolt threading 26.2. In order to simplify the assembly of the locking device 10, the traction means 17 can be designed in two or more pieces, wherein the first end 17.1 is permanently connected to the locking device 10 in a manner allowing movement. An eyelet 17.5 in the form of a bore hole is included on this first traction means end 17.1, into which a Bowden wire, a rod, chain, or the like can be attached in order to connect the traction means 17 as a whole to the actuating element 23. The eyelet 17.5 named above is better illustrated in FIG. 7.

The locking device 10 according to the invention is illustrated in FIG. 7 with a point of the first end 17.1 of the traction means 17. This end 17.1 is designed with an arrow shape, and forms a positive fit with a projection in the passage 15.4 of the locking part 15.2. The connection between the traction means 17 and the locking means 15, particularly the locking part 15.2, is designed in this case as a latch means 27. In FIG. 15 [sic], the locking means 15 is in its unlocked position I, which has been reached by an emergency unlocking. In this case, the collar-shaped edge of the arrow-shaped point of the first end 17.1 of the traction means 17 works together in a positive-fitting manner with the circular projection in the passage 15.4. As such, the emergency unlocking mechanism 16 is capable of switching the locking means 15, and particularly the locking part 15.2, from its locked position II to its unlocked position I by means of the traction means 17. As can further be seen in FIG. 7, the assembly of the first end 17.1 of the traction means 17 is quite easy, because it only requires a light pressure to be inserted into the passage 15.4 before the latch means 27 is locked by a positive fit. For this purpose, the entire traction means 17 can be assembled by a linear movement. In order to achieve a movement of the locking means 15, in normal cases, a clearance 15.11 is included in the locking part 15.2, into which the arrow-shaped point of the first end 17.1 of the traction means 17 can plunge, without itself executing a movement. In order to improve the spring characteristics of the arrow-shaped point of the first end 17.1 of the traction means 17, a longitudinal cut can be included in the point.

In FIG. 5, a longitudinal cut C-C is illustrated through the locking device 10 according to the invention, wherein the charging cable plug 22 is inserted into the charging cable socket 21 and has been locked. For this reason, the locking means 15 is in the locking position II. In this case, the locking means 15 forms a positive-fit connection by means of the point of its locking part 15.2, to a recess 22.1 of the charging cable plug 22. By way of example, a bevel 15.12, rounding 15.12, and/or chamfer 15.12 can be included on the point of the locking part 15.2 as a mechanical overload means 25. By means of this chamfer 15.12, it can be contemplated that the charging cable plug 22 is torn out of the charging cable socket 21 with great force, without creating damage. Of course, the bevel 15.12 and/or chamfer 15.12 above can also be contemplated only as an option.

FIG. 2 illustrates the cut-line B-B through the locking device 10 according to the invention shown in FIG. 1. In this case, the charging cable plug 22 is in its charging cable socket 21 and the mechanical connection is locked by the locking means 15, particularly the locking part 15.2. As a result, the charging cable plug 22 is secured in the charging cable socket 21 in a positive-fitting manner by the locking device 10. In addition, a drainage channel 21.3 is arranged on the charging cable socket 21, in the event that moisture or greater amounts of liquid might penetrate the charging cable socket 21. This can then be diverted via the drainage channel 21.3 from the charging cable socket 21. The charging cable socket 21 itself has a flattened protection against reverse polarity 21.2 which is arranged on the upper side.

FIG. 3 shows the cut line A-A through the locking device in FIG. 1, said cut line being comparable to cut line B-B, but in this case the locking means 15 is in its unlocked position I. As can be readily seen, the locking means 15 is constructed in two pieces, wherein the spring means 15.9 is arranged between the guide part 15.1 and the locking part 15.2. The trigger force of the overload means 25 (see FIG. 5) can be determined by the spring means 15.9. In FIG. 3, two positions for the overload means 26 are illustrated, at which points corresponding force sensors can be arranged.

Figure 4C:
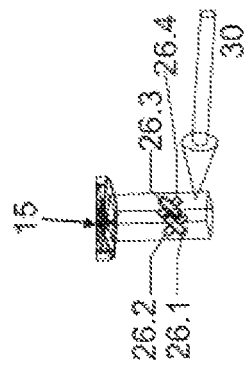
FIGS. 4a-c show variants for the arrangement of one or multiple sensors of the overload means in the region of the locking means.
Figure 4B:
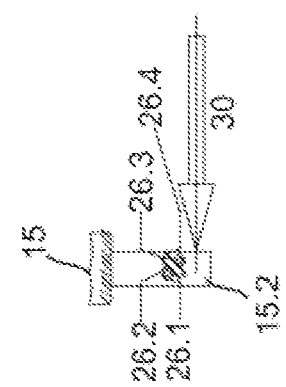
Figure 4A:
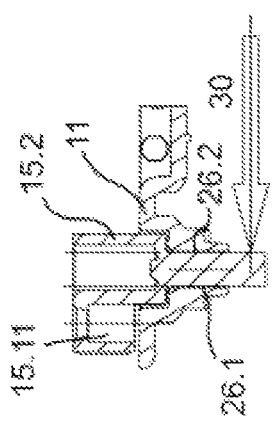

FIGS. 4a to 4c illustrate possible arrangements for the sensors 26.1-4 for an electrical overload means 26, in an exemplary manner. In this case, a sensor 26.1 in FIG. 4a can be arranged between the locking means 15, particularly the locking part 15.2 and the guide segment 11.6. This sensor 26.1 is preferably arranged on the opposite side of the locking means 15, on which side the tensile force 30 is applied which works on the charging cable 27 as a result of the application of undue force. In addition, a second sensor 26.2 of the overload means 26 can likewise be arranged on the same side where the tensile force 30 acts on the locking means 15. As a result of the tensile force 30 on the locking means 15.2 of the locking means 15, it is possible to very precisely determine the force applied—and particularly the acceleration, velocity, and amplitude thereof. The corresponding forces can be detected by the sensors of the overload means 26 by strain gauges or other force sensors.

In FIG. 4b, two force sensors 26.1-2 and/or 26.3-4 are used on each side of the locking part 15.2 of the locking means 15, such that the application of undue force can be determined precisely by a measurement of forces via the bending and shearing of the locking means 15—particularly of the locking part 15.2. In this case, a Wheatstone bridge can be used to measure and evaluate the four sensors 26.1 to 4. A similar embodiment is illustrated in FIG. 4c; however, in this case, the locking part 15.2 of the locking means 15 does not have a circular cross-section, but rather a rectangular, and particularly square, cross-section. In this case as well, a total of four sensors can be included which exclusively measure a deformation of the locking part 15.2. As can be readily seen, the force 30 is applied orthogonally to the direction of measurement of the sensors 26.1 to 4, because these are loaded from the deformation of the locking part 15.2. However, as a result of the force 30 in FIG. 4c, the sensors 26.1 to 4 are not clamped between the locking means 15 and a guide segment 11.6 for the locking means 15.

Figure 8:
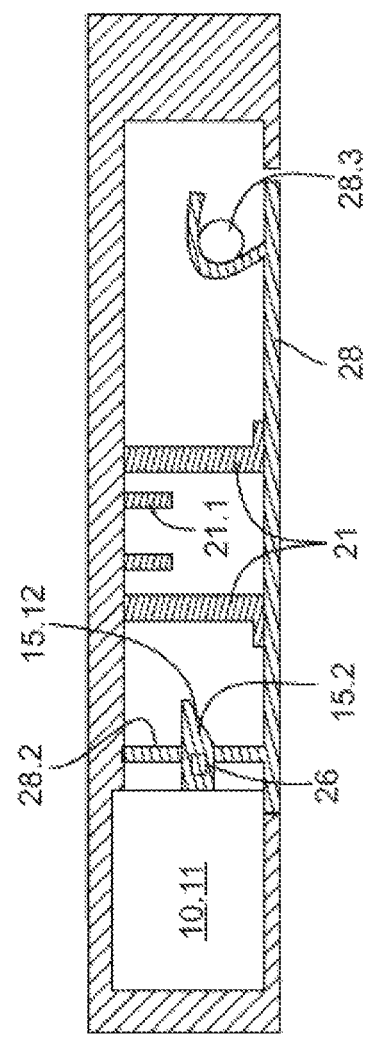
FIG. 8 shows a schematic cutaway illustration of a locking device according to the invention on a vehicle or a charging station, which holds a panel in its closed position, particularly in front of a charging cable socket.

FIG. 8 shows a schematic cutaway view of the locking device 10 according to the invention, as is used on a vehicle or a charging station, by way of example. In this case, the locking means 15 locks, with the locking part 15.2 which projects from the housing 11, a panel 28 which is illustrated in a closed position. In this closed position, the panel 28 covers the charging cable socket 21 which serves the purpose of being connected to the charging cable plug 22, in order to supply the vehicle with external electrical energy, by way of example. The panel 28 is arranged in a manner allowing rotation and/or pivoting about its axis of rotation 28.3, thereby enabling it to move back and forth between its open position and closed position. In addition, the panel 28 has a projecting flank 28.2 on its inner side, on which an opening 28.1 is included. This opening 28.1 is included for the purpose of engaging in a positive-fitting and/or force-fitting manner with the locking means 15, particularly the locking means 15.2 of the locking device 10 according to the invention when the panel 28 is in the closed position. As such, it is possible, by means of the panel 28, to protect the charging cable socket 21 from contamination and moisture by bringing the panel 28 into the closed position when no charging cable plug 22 is plugged to the charging cable socket 21.

Figure 9:
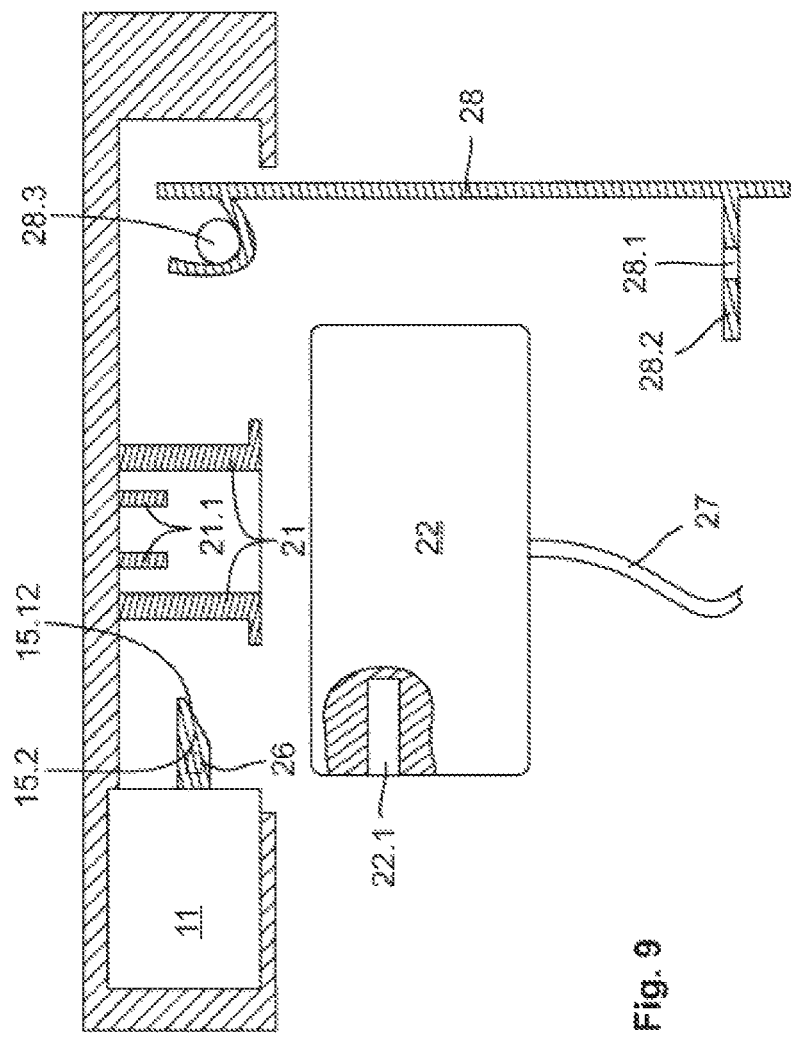
FIG. 9 shows a comparable cutaway illustration of the locking device in FIG. 8, wherein the panel is arranged in its open position and a charging cable plug can be plugged onto the charging cable socket.

FIG. 9 illustrates a cutaway drawing which is comparable to FIG. 8, where, however, the panel 28 has been rotated in its open position about the axis of rotation 28.3. In this position, it is also possible to clearly see the flank 28.2 which projects on the inner side, along with the opening 28.1. In this open position, the charging cable plug 22 can be plugged on the charging cable socket 21. In this case, a bevel 15.12 can be arranged on the locking means 15 of the device 10 according to the invention, which serves the purpose of making it possible to plug the charging cable plug 22 to the charging cable socket 21 in the locking position II as well. In this case, the bevel 15.12 serves the purpose of having the spring-loaded 15.9 locking part 15.2 pressed into the housing 11 of the locking device 10 when the charging cable plug 22 is plugged to the charging cable socket 21. Next, the locking part 15.2 travels into the recess 22.1 of the charging cable plug 22 provided for this purpose, as a result of the pressing force of the spring element 15.9, in order to lock the charging cable plug [22]. If the bevel 15.12 of the locking part 15.2 of the locking means 15 is also configured on the upper side (from the point of view of FIGS. 8 to 10), this upper bevel 15.12 (not illustrated in FIGS. 8 to 10) can also serve as a mechanical overload means 25.

In FIG. 10, the charging cable plug 22 is plugged on the corresponding charging cable socket 21, and is securely locked by the locking means 15 which is in the locking position II. This connection between the charging cable plug 22 and the device 10 according to the invention can only be released by the unlocked position I of the locking means 15. According to the invention, only upon the application of undue force to the plug 22 in the direction of the arrow 30, is it possible to unlock the plug 22 via the overload means 25 or 26. Otherwise, the locking and unlocking of the charging cable plug 22 occurs as desired—meaning during normal operation. In FIG. 10, the point of the locking part 15.2 is designed with a rectangular shape, differently than in FIGS. 8 and 9, such that a rounding or chamfer 15.12 is not present. As a result, the locking means 15 in this case must always be moved by its drive 13, because otherwise it is not possible to plug-in the plug 22 in the locking position II of the locking means 15. As a result, the locking means 15 in FIG. 10 must previously be switched to the unlocked position I.

An enlarged schematic cutaway drawing from FIG. 10 is illustrated in FIG. 11, wherein the locking means 15 locks the charging cable plug 22. In addition, the mechanical overload means 25 is illustrated in FIG. 11 in the form of a predetermined breaking point 15.13. This predetermined breaking point 15.13 is configured as a narrowing on the locking means 15, particularly on the locking part 15.2, and advantageously lies between the housing 11 and the charging cable plug 22 in the locking position II of the locking means 15. Upon an application of undue force to the charging cable plug 22 in the direction of the arrow 30, this mechanical overload means 25 in the form of the predetermined breaking point 15.13 functions such that the locking part 15.2 shears off, such that the charging cable plug 22 can be removed from the charging cable socket 21.

The invention claimed is:

1. A locking device for locking and unlocking a panel and/or a charging cable plug of a charging cable for a vehicle, to a charging cable socket, having
   at least one moving locking means in the form of a locking bolt for mechanically locking the panel and/or the charging cable plug, the same having the charging cable socket, wherein the locking means has at least one locking position in which the panel and/or the charging cable plug can be locked by the locking means, and
   one unlocked position in which the panel and/or the charging cable plug can be released by the locking means, and
   an electromechanical drive which drives the locking means, such that it is possible to switch between the locking position and the unlocked position,
   wherein
   at least one overload means is configured between the panel and/or the charging cable plug and the charging cable socket, by means of which the charging cable plug can be separated from the charging cable socket when in the locked position when undue force is applied, and/or by means of which the panel can be switched to the open position, wherein the overload means includes at least one sensor which measures the application of undue force and generates a corresponding overload signal, wherein the sensor measures forces which result from the application of undue force.

2. A locking device according to claim 1,
   wherein
   the overload means switches the locking means from the locking position to the unlocked position, thereby enabling the charging cable plug to be removed from the charging cable socket and/or the panel to be switched into the open position.

3. A locking device according to claim 1, wherein
   the overload means, when in the locking position is configured for non-destructively opening the panel and/or separating the charging cable plug from the charging cable socket.

4. A locking device according to claim 1,
   wherein
   the overload means switches the locking means in a purely mechanical manner from the locking position to the unlocked position.

5. A locking device according to claim 1,
   wherein
   the overload means controls, by means of an overload signal, the electromechanical drive of the locking means when undue force is applied, whereby it is possible to switch the locking means from the locking position to the unlocked position by means of the electromechanical drive, upon a predetermined trigger force.

6. A locking device according to claim 1,
   wherein
   an electrical charging current, in the charging cable and/or in the locking device, can be cut by the overload signal.

7. A locking device according to claim 1,
   wherein
   a trigger force can be adjusted for and/or by the overload means.

8. A locking device according to claim 1, wherein
at least one sensor of the overload means is designed as a strain gauge, a piezoelectric, inductive, magnetoelastic, hydraulic, or mechanical force transducer, or as an optical sensor, or the sensor is designed as a distance sensor, resistance sensor, force sensor, or contact sensor.

9. A locking device according to claim 1, wherein
at least one sensor of the overload means is arranged between the locking means and a guide segment for the locking means, wherein the guide segment forms at least a part of a housing of the locking device.

10. A locking device according to claim 1, wherein
at least two sensors of the overload means is arranged between the locking means and a guide segment for the locking means, and
wherein the two sensors have a different direction of measurement, perpendicular to that of the other, and/or
wherein the two sensors are arranged on opposite sides of the locking means.

11. A locking device according to claim 1, wherein
at least one sensor of the overload means is arranged on the locking means.

12. A locking device according to claim 1, wherein
at least one sensor of the overload means is arranged on the guide segment for the locking means.

13. A locking device according to claim 1, wherein
at least one sensor of the overload means is arranged between the panel and/or the charging cable plug and the charging cable socket,
wherein the sensor is designed as a distance sensor, resistance sensor, force sensor, or contact sensor.

14. A locking device according to claim 1, wherein
at least one sensor measures the position of the locking means and/or at least one sensor measures the position of the panel and/or of the charging cable plug in the charging cable socket.

15. A method for locking a panel and/or a charging cable plug of a charging cable, for a vehicle, to, and unlocking the same from, a charging cable socket having at least one moving locking means, in the form of a locking bolt which serves the purpose of mechanically locking the panel and/or the charging cable plug to the charging cable socket, wherein the locking means has at least one locking position in which the panel and/or the charging cable plug can be locked by the locking means, and one unlocked position in which the panel and/or the charging cable plug can the released by the locking means, and
an electromechanical drive which drives the locking means, thereby making it possible to switch between the locking position and the unlocked position,
wherein
when undue force is applied to the mechanical connection between the panel and/or the charging cable plug and the charging cable socket when in the locking position, the mechanical connection is released, by an overload means, whereby the charging cable plug is separated from the charging cable socket and/or the panel is switched to the open position, wherein the overload means includes at least one sensor which measures the application of undue force and generates a corresponding overload signal, wherein the sensor measures forces which result from the application of undue force.

16. A method according to claim 15, wherein
in the event of an undue application of force, the locking means is switched from the locking position into the unlocked position by the overload means.

17. A method according to claim 15, wherein
the overload means measures the application of undue force, by means of a sensor, and controls the electromechanical drive of the locking means in such a manner that the locking means is switched from the locking position to the unlocked position.

18. A method according to claim 15, wherein
in the event of the undue application of force, the mechanical connection between the panel and/or the charging cable plug and the charging cable socket in the locking position is non-destructively released by means of the locking means.

19. A method according to claim 15, wherein
in the event of an undue application of force, the electrical charging current, in the charging cable and/or in the locking device is cut, and/or in that an alarm signal for the cutting of said current is produced.

20. A method according to claim 15, wherein
a trigger force is set, for and/or by the overload means, and when reached, the mechanical connection between the charging cable plug and the charging cable socket is separated.

* * * * *